US007598693B2

(12) United States Patent
Wang et al.

(10) Patent No.: US 7,598,693 B2
(45) Date of Patent: Oct. 6, 2009

(54) CONTAINER WITH BUFFERED COVER

(76) Inventors: Xin Wang, No.47, Pushang Zone, Jinshan Industrial Area, Fuzhou, Fujian 350008 (CN); Jiangqun Chen, Rm 801, Building 1, Hualin Garden, Central Lianjiang Rd., Fuzhou, Fujian 350011 (CN)

( * ) Notice: Subject to any disclaimer, the term of this patent is extended or adjusted under 35 U.S.C. 154(b) by 442 days.

(21) Appl. No.: 11/578,203

(22) PCT Filed: Aug. 16, 2005

(86) PCT No.: PCT/CN2005/001274

§ 371 (c)(1),
(2), (4) Date: Oct. 11, 2006

(87) PCT Pub. No.: WO2006/079263

PCT Pub. Date: Aug. 3, 2006

(65) Prior Publication Data

US 2007/0272691 A1 Nov. 29, 2007

(30) Foreign Application Priority Data

Jan. 31, 2005 (CN) .................... 2005 2 0068983 U

(51) Int. Cl.
*G05D 3/00* (2006.01)

(52) U.S. Cl. ......................... 318/468; 318/16; 318/560; 53/526; 53/567; 53/576

(58) Field of Classification Search ......... 318/370–379, 318/430–439; 220/495.06; 53/567, 576
See application file for complete search history.

(56) References Cited

U.S. PATENT DOCUMENTS 5,329,212 A * 7/1994 Feigleson .................... 318/16
6,334,542 B1 * 1/2002 Hsu ........................... 220/263
6,612,099 B2 * 9/2003 Stravitz ....................... 53/526
6,752,476 B2 * 6/2004 Lin ............................ 312/290
6,804,930 B2 * 10/2004 Stravitz ....................... 53/211
7,146,785 B2 * 12/2006 Stravitz ....................... 53/567
7,434,377 B2 * 10/2008 Stravitz et al. ................ 53/567
7,503,152 B2 * 3/2009 Stravitz et al. ................ 53/211
2002/0162304 A1 * 11/2002 Stravitz ....................... 53/526
2002/0190615 A1 * 12/2002 Lin ............................ 312/297
2003/0208995 A1 * 11/2003 Stravitz ....................... 53/576
2004/0083681 A1 * 5/2004 Stravitz ..................... 53/138.1
2004/0130438 A1 * 7/2004 Garber ...................... 340/10.2
2005/0028491 A1 * 2/2005 Stravitz ....................... 53/470

(Continued)

*Primary Examiner*—Paul Ip
(74) *Attorney, Agent, or Firm*—Raymond Y. Chan; David and Raymond Patent Firm

(57) ABSTRACT

A dustbin, adapted to be opened/closed automatically by induction actuated, includes a container body, cover, motor and actuating device, wherein the motor is connected to the driven element of the cover through the actuating device. The dustbin includes a sensing and controlling device of the stroke of the cover, wherein a cover stroke perception and a shut off circuit, the cover stroke perception is connected with the shut off circuit, and the shut off circuit is connected with the motor, the shut off circuit receives the activating signal from the cover stroke perception and then controls the motor to actuate correspondingly, the cover's stroke inducted by the trigger; point of the cover stroke perception is less than the whole stroke during the closing of the cover. The noise of the crash between the cover and the container body is low, and closing of the cover is rapid and spiffy.

2 Claims, 4 Drawing Sheets

U.S. PATENT DOCUMENTS

2005/0183400 A1* 8/2005 Stravitz et al. ................ 53/567
2005/0183401 A1* 8/2005 Stravitz et al. ................ 53/567
2005/0188661 A1* 9/2005 Stravitz et al. ................ 53/567
2005/0193691 A1* 9/2005 Stravitz et al. ................ 53/567
2005/0193692 A1* 9/2005 Stravitz et al. ................ 53/567
2005/0274093 A1* 12/2005 Stravitz et al. ................ 53/567
2006/0021301 A1* 2/2006 Stravitz et al. ................ 53/576
2006/0130439 A1* 6/2006 Stravitz et al. ................ 53/567
2007/0175182 A1* 8/2007 Stravitz et al. ................ 53/576
2007/0180798 A1* 8/2007 Stravitz et al. ................ 53/576
2007/0246465 A1* 10/2007 Stravitz et al. .............. 220/200
2009/0057317 A1* 3/2009 Wang et al. ............ 220/495.06

* cited by examiner

CONTAINER WITH BUFFERED COVER

BACKGROUND OF THE PRESENT INVENTION

1. Field of Invention

The present invention relates to a container, and more particularly to a container cover for a container, wherein the container cover incorporates with an induction-actuated arrangement to open and close the cover panel of the container cover in a hydraulic manner.

2. Description of Related Arts

In prior art, the induction-actuated container makes big noise when closing. The noise comes from collision between the container cover and the container body. The cover turns 90 degrees from open state to close state and accelerates gradually; coming to the utmost at the moment is closes, causing great noise. It is a hassle for a user regarding the noise especially at nighttime.

SUMMARY OF THE PRESENT INVENTION

A main object of the present invention is to provide a container cover incorporating with an induction-actuated arrangement to open and close the cover panel of the container cover in a hydraulic manner so as to moderate the noise generated therefrom. In other words, the cover panel is actuated to open and close in a decelerating manner without using any hydraulic device.

Accordingly, in order to accomplish the above object, the present invention provides a container, such as a trash container or a dustbin, comprising a container body, a container cover having a cover panel, an electric motor and a transmission device. The motor is transmissively connected with the driven member of the container cover through the transmission device. The container further comprises a route sensor, controller, a route feeler, and a cut-off circuit. The route sensor is communicatively connected to a controlling end of the cut-off circuit, wherein the cut-off circuit is electrically connected to the electric motor. The cut-off circuit controls the output of the electric motor after receiving a signal from the route feeler, which can detect a route shorter than a total closing route. In other words, the cut-off circuit receives the actuating signal at a trigger point during the cover panel is in a closing process that a route of the cover panel is smaller than a total route of the cover panel between an open state and a close state. Therefore, the trigger point is preset between the open state and the close state of the cover panel.

Accordingly, before the cover panel closes completely, the route feeler sends a signal to the cut-off circuit to stop the output of the electric motor immediately. At the same when the electric motor is stop to transmit the power towards the cover panel, the cover panel will keep moving by inertia. Therefore, the cover panel will be decelerated by itself before contacting with the container body. In other words, the cover panel contacts with the container body with lower speed and relatively small kinetic energy so as to minimize the noise generated by the contact between the cover panel and the container body.

The object of the present invention could also be realized through the following aspects.

The route sensor and controller also comprises a short-circuit circuitry having a controlling end connecting to the route feeler and an outputting end connecting to two terminals of the electric motor.

Accordingly, when the short-circuit circuitry turns off the electric motor, the short-circuit circuitry generates an input to the terminals of the electric motor to form a loop to create a braking effect. In other words, when the cover panel closes by inertia, the transmission device transmits the rotational power from the cover panel back to the electric motor. According to the electromagnetic principle, the DC electric motor becomes a dynamo that the current passes through the induction coil of the electric motor. Therefore, the cover panel will be decelerated by the electric motor while closing to minimize the noise from the cover panel with respect to the container body.

The route sensor and controller also comprises a reversing circuit, which has a controlling end connecting to the route feeler, electrically coupling between the power source and the electric motor.

Accordingly, when the cut-off circuit stops the output of the electric motor, the route feeler activates the reversing circuit such that the electric motor with the reversed current is actuated to output the opposed rotational power, i.e. the opening direction of the cover panel, to enhance the deceleration of the cover panel at the close state.

The route sensor and controller also comprises a delay circuit incorporating one of the above mentioned short-circuit circuitry and the reversing circuit. The controlling end of short-circuit circuitry or the reversing circuit is electrically coupled with the route feeler and connected to the electric motor. The delay circuit and the short-circuit circuitry (or the reversing circuit) are also connected to the cut-off circuit.

Accordingly, the delay circuit controllably activates the short-circuit circuitry (or the reversing circuit) for a relatively short time. The short-circuit circuitry (or the reversing circuit) is deactivated when the cover panel is not closed completely, i.e. at the closing process. The cut-off circuit is activated to actuate the electric motor to drive the cover panel until the cover panel is completely closed. Since the cover panel is stopped during the closing process, the cover panel operates two sequent closing actions to decelerate the closing speed of the cover panel. In other words, the cover panel moves at shorter distance to the close state after the cover panel is temporarily stopped in comparison with the cover panel moves from the open state to the close state. Therefore, the cover panel will be decelerated while closing to minimize the noise from the cover panel and to ensure the cover panel being completely closed.

The above mentioned cut-off circuit, the short-circuit circuitry or the reversing circuit consists of four triodes Q2, Q3, Q4, Q5 and diodes D5, D6, D7, D8 to form a forward/backward actuating circuit.

The route feeler can be a position sensor directly detecting the traveling displacement of the cover panel, i.e. route of the cover panel between the open state and the close state. Alternatively, the route feeler can be a time delay switch actuating the cover panel at a predetermined time after an actuating signal is detected.

The route sensor can be a route feeler comprising of a route switch and a cam, a magnetism-electric route sensor comprising a magnetic-controlled switch and a magnet, or a photo sensor comprising a light-controlled switch.

The route sensor can be an individual sampling circuit or a combination of the sampling circuit and a computing device (counter device) if necessary.

The movable components, such as the cam, the magnet, etc, can be mounted in the transmission device or in the container cover.

When the photo sensor is used, a norm circuit (reference circuit) and a comparing circuit are incorporated with the route cover and the controller. The comparing circuit comprises the sampling signal from the computing device with the norm value of the norm circuit. When the value is the same or bigger than the norm valve, the comparing circuit is triggered that the cut-off circuit is controlled to be activated.

The above mentioned computing device, the norm circuit, the comparing circuit and the delay circuit can be integrated in a IC3, mode CF745 chip.

The detailed description of the route sensed by the actuating point of the route feeler is shown below.

The cover route sensed by the trigger point of route sensor is longer than half of the total route of closing. The best should be 90% to 70% of the total route.

When the cover panel continuously closes by its inertia, the upper limit of the cover route sensed by the actuating point of the route feeler is preferably preset, i.e. 90% or approximately 90% of the route. When the cover brakes or beings the second closing motion, a lower limit is preferably preset, i.e. 70% or approximately 70% of the route. The brake time is about 0.2 second and the second closing time is from 0.1 second to 0.3 second.

As a result, in comparison with the conventional container cover, the present invention provides a container cover adapted to smoothly and rapidly close and to minimize the noise during closing movement.

Figure 1:
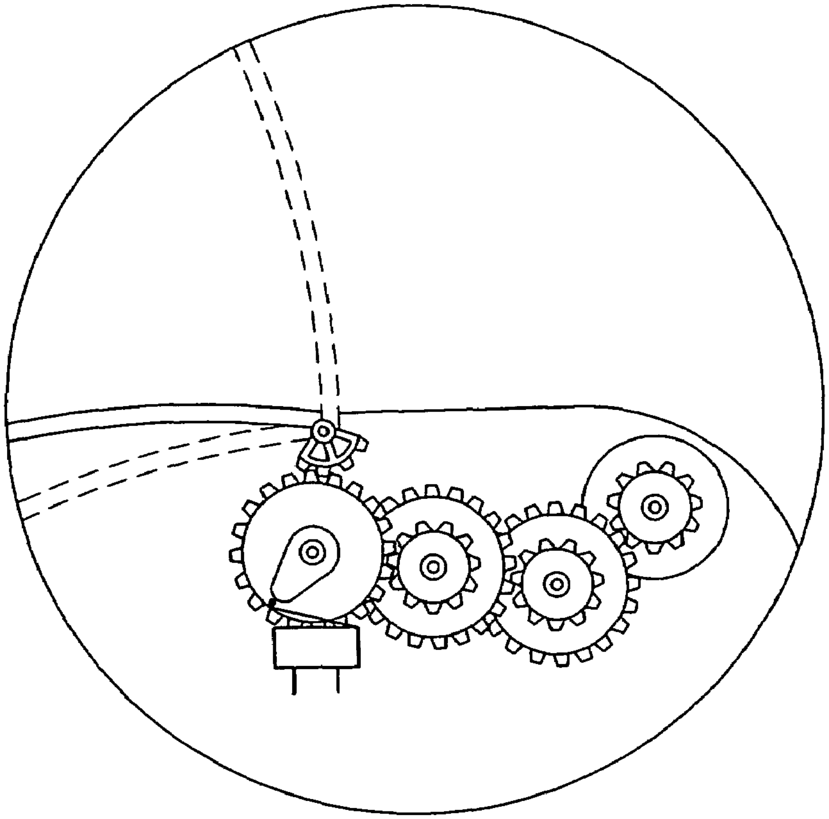
FIG. 1 is a schematic diagram showing configuration of the delay-closing container according to a first embodiment of the present invention.

Accordingly, the reference characters of the present invention are: 1-route feeler, 11-magnetic control switch, 12-computing device, 2-cut-off circuit, 3-short circuit circuitry, 4-electric motor, 6-comparing circuit, 7-delay circuit.

DETAILED DESCRIPTION OF THE PREFERRED EMBODIMENT

Figure 2:
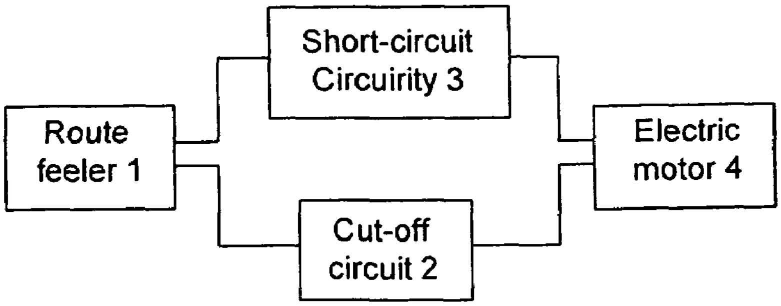
FIG. 2 is a block diagram according to the above first preferred embodiment of the present invention.

Referring to FIGS. 1 and 2 of the drawings, a container according to the first preferred embodiment of the present invention comprises a container body, a container cover having a cover panel, an electric motor, and a transmission device. The electric motor is transmissively connected with a driven member of the cover panel through the transmission device. The container cover further comprises a route feeler 1 electrically connected to a controlled end of a cut-off circuit 2, wherein the cut-off circuit 2 is electrically connected to the electric motor 4. The cut-off circuit 2 receives a signal from the route feeler 1 to activate the electric motor 4, wherein the route movement of the electric motor 4 at a trigger point is shorter than the route of the cover panel, i.e. between the open state of the cover panel and the close state thereof. Accordingly, the route movement of the electric motor 4 reaching at the trigger point is approximately 70% of the route of the cover panel. The route sensor and controller further comprises a short-circuit circuitry 3, wherein the controlling end of the short-circuit circuitry 3 is electrically connected to the route feeler 1 and is electrically coupled between two terminals of the electric motor 4. The route sensor comprises a route switch and a cam. For closing the cover panel, the DC electric motor 4 is powered with backward direct current, i.e. the opposite direction of the current of opening the cover panel. Then, the electric motor 4 drives the cover panel to its close state through a decelerating gear unit of the transmission device. When the cover panel moves at a position close to its close state, for example, the cover panel has been moved 80° from the total route of 90°, the cam of the route feeler 1 is triggered by the route switch to send a signal to the cut-off circuit 2 and the short-circuit circuitry 3 so as to deactivate the electric motor 3. Therefore, the electric motor 3 is stopped to generate the output to the cover panel. Since the cover panel is not completely closed, the cover panel will keep moving to its close state by inertia. It is worth to mention that when the cover panel moves by its inertia, the power from the cover panel transmits to the electric motor through the transmission device such that the electric motor becomes a dynamo. Since the current passes through the coil in the electric motor after the electric motor is cut off, the electric motor generates a braking output to stop the movement of the cover panel in a relatively short period of time. Such braking effect is the same as braking a car.

Figure 3:
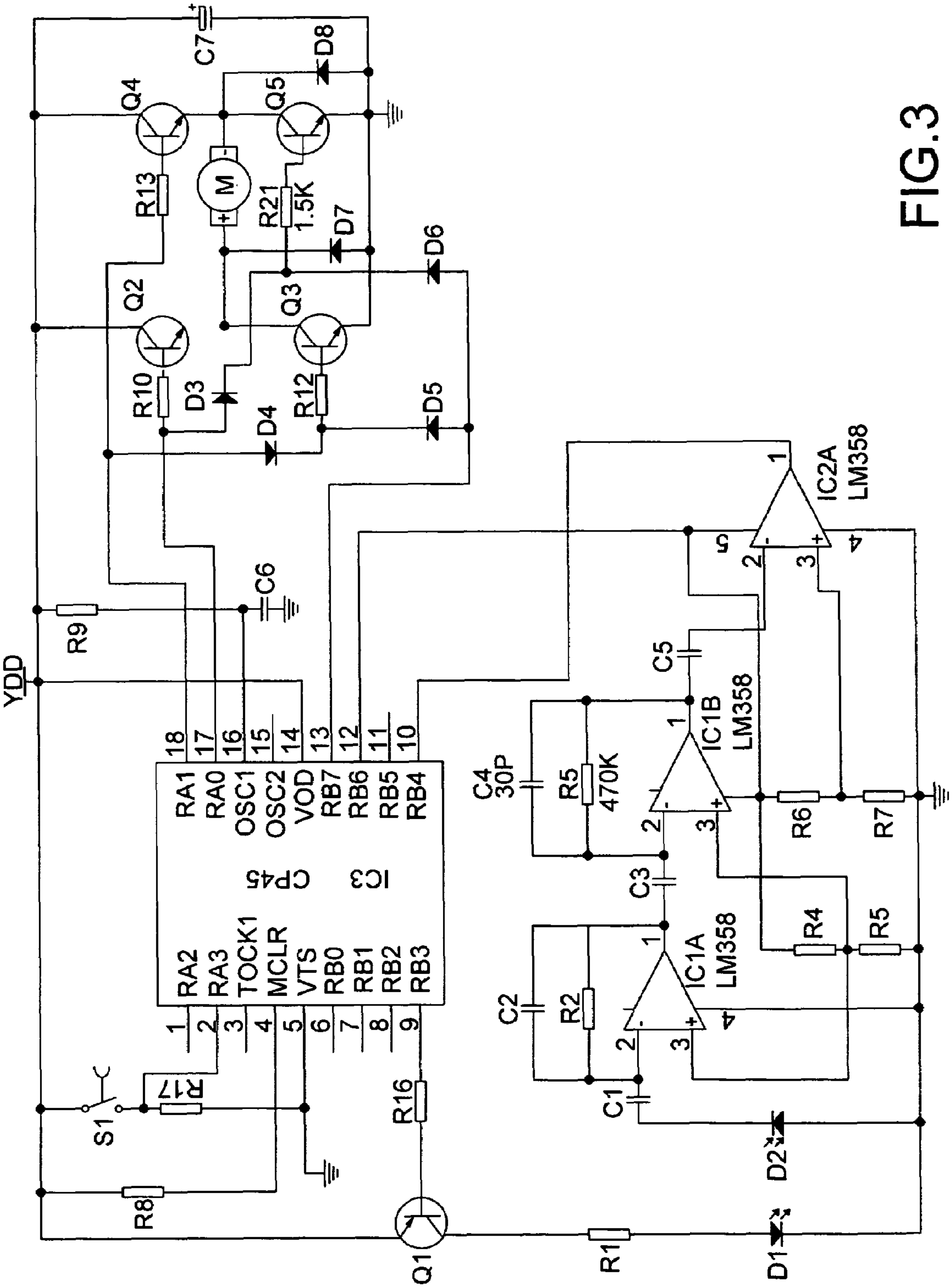
FIG. 3 is a circuit diagram according to the above first preferred embodiment of the present invention.

As shown in FIG. 3, when closing the cover panel, output of IC3 is in higher level, RA0 and Rb7 is in lower level. Q3 and Q4 in the driving circuit are connected while Q2 and Q5 are cut off. The electric motor M generates an opposed rotational output under an opposed voltage to drive the gear unit, the cam and the cover panel to rotate. When the cover panel moves at a position close to its close state, i.e. moving 80° from the total route of 90°, the cam 3 contacts the route switch. After the route switch is triggered, the output terminal RA3 of IC3 reaches to a higher level from its lower level. Through the process of IC3, the outputs of RA1 and RA0 become lower level and deactivate the triodes Q2 and Q3. RB7 outputs a higher energy level that triodes Q3 and Q5 are connected through D5, R12 and D6, R21 respectively. After Q3 and Q5 are connected with D8 and D7 respectively, the two terminals of the electric motor form a positive and negative loops as a short circuit of the electric motor. After the motor is stopped generating the output, the cover will continuously move to its close state by inertia through the 10° of route. At the same time, the electric motor will generate the braking output to the cover panel to slow down the cover panel as a braking effect. Therefore, the cover panel will completely close with lower speed to minimize the noise from the movement of the cover panel with respect to the container body. It is worth to mention that all other necessary components of the container, which are not mentioned above, are the same as the conventional container.

Figure 4:
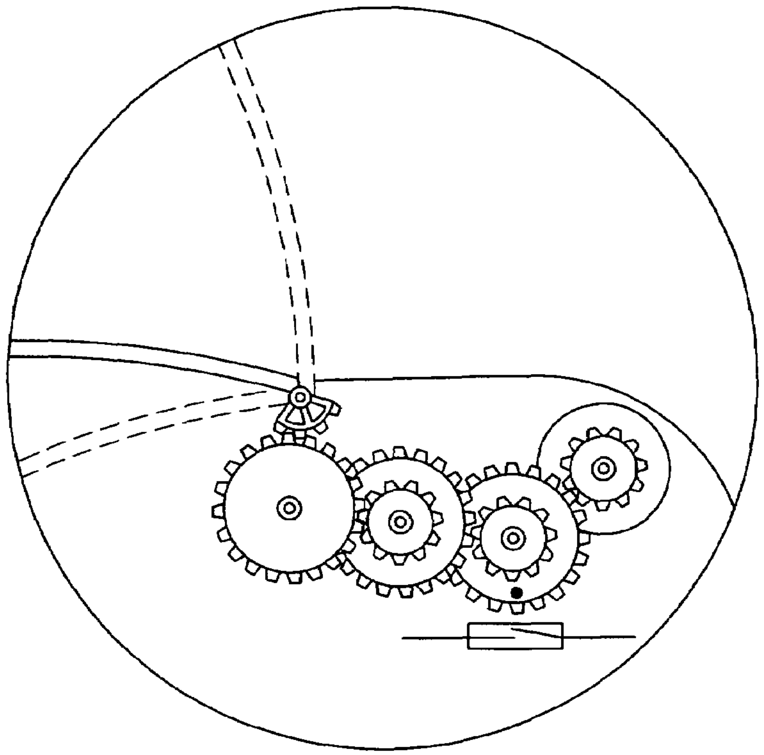
FIG. 4 is a schematic diagram showing the configuration of the delay-closing container according to a second embodiment of the present invention.
Figure 5:
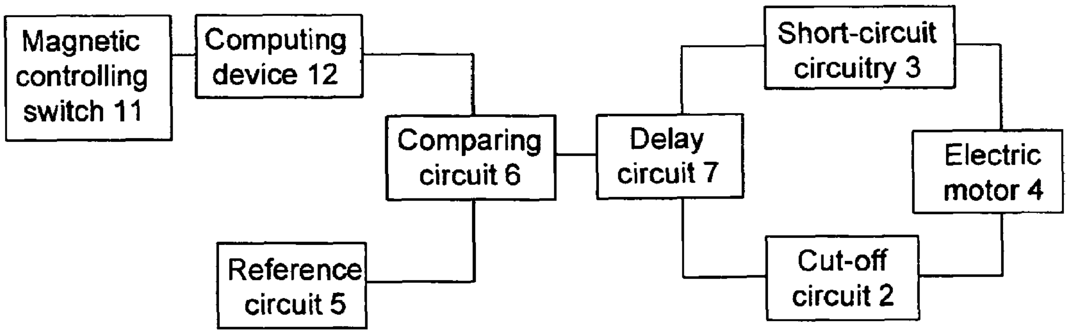
FIG. 5 is a block diagram according to the above second preferred embodiment of the present invention.

As shown in FIGS. 4 and 5, the container according to a second embodiment is illustrated. The delay-closing container comprises a container body, a container cover having a cover panel, and a transmission device. The electric motor is transmissively connected with a driven member of the cover panel through the transmission device. The container cover further comprises a route feeler 1 electrically connected to a controlled end of a cut-off circuit 2, wherein the cut-off circuit 2 is electrically connected to the electric motor 4. The cut-off circuit 2 receives a signal from the route feeler I to activate the electric motor 4, wherein the route movement of the electric motor 4 is shorter than the route of the cover panel, i.e. between the open state of the cover panel and the close state thereof. Accordingly, the route movement of the electric motor 4 is approximately 80% of the route of the cover panel. The route sensor and controller further comprises a delay circuit 7 and a short-circuit circuitry 3, wherein the controlling end of the short-circuit circuitry 3 is electrically connected to the route feeler 1 and is electrically coupled between two terminals of the electric motor 4. The delay circuit 7 is electrically connected to the short-circuit circuitry 3 and to the cut-off circuit 2. The route sensor is a magnetic-electricity sensor comprising a magnetic controlling switch 11 and a magnet. For closing the cover panel, the DC electric motor 4 is powered with backward direct current, i.e. the opposite direction of the current of opening the cover panel. After the cover panel moves 80% of the total route, the delay circuit 7 controllably activates the short-circuit circuitry 3 for a relatively short time, wherein the short-circuit circuitry 3 is deactivated and the cut-off circuit 3 is activated to re-power the electric motor. In other words, the cut-off circuit 3 is activated to actuate the electric motor to drive the cover panel until the cover panel is completely closed. Since the cover panel is stopped during the closing process, the cover panel operates two sequent closing actions to decelerate the closing speed of the cover panel. Preferably, the cover panel completely closes approximately 0.1 to 0.3 second after the cover panel is stopped during the closing process. Therefore, the cover panel moves at shorter distance to the close state after the cover panel is temporarily stopped in comparison with the cover panel moves from the open state to the close state. As a result, the cover panel will be decelerated while closing to minimize the noise from the cover panel and to ensure the cover panel being completely closed.

Figure 6:
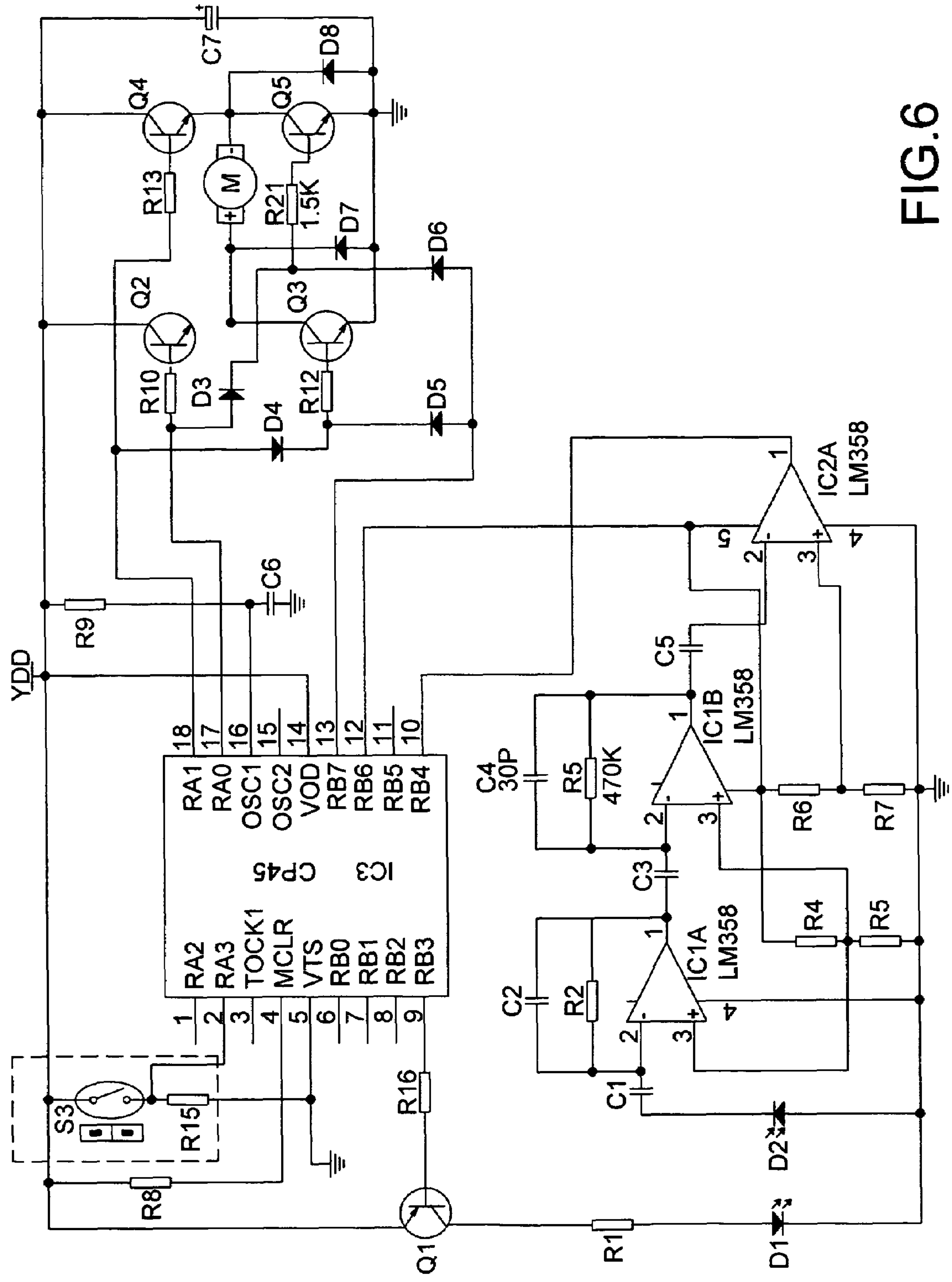
FIG. 6 is a circuit diagram according to the above second preferred embodiment of the present invention.

As shown in FIG. 6, when the cover panel closes, output RA1 of IC3 is in higher level while outputs of RA0 and RB7 are in lower level. Q3 and Q4 of the driving circuit are connected while Q2 and Q5 thereof are cut off. An opposite voltage is applied to the electric motor M to generate an opposed rotational output so as to drive the cover panel to turn through the gear unit and cam. When the cover panel flips at 70 degrees at a counterclockwise direction, the gear unit revolves 8 revolutions. Eight impulse signals from the magnetic-controlling switch are sent to the computing device of IC3 for processing and comparing with a norm value. When the value is the same or higher than the norm value, IC3 controls outputs of RA1 and RA0 to be in lower level and output of RB7 in higher level wherein the process of IC3 takes about 0.1 to 0.3 second. RB7 outputs a higher energy level that triodes Q3 and Q5 are connected through D5, R12 and D6, R21 respectively. After Q3 and Q5 are connected with D8 and D7 respectively, the two terminals of the electric motor form a positive and negative loops as a short circuit of the electric motor. After the motor is stopped generating the output, the cover will continuously move to its close state by inertia through the 10° of route. At the same time, the electric motor will generate the braking output to the cover panel to slow down the cover panel as a braking effect. Output of IC3 turns RA1 to be in higher level, RA0 and RA7 to be in lower level once again. Then, Q3 and Q4 of the driving circuit are connected while Q2 and Q5 thereof are cut off. An opposite voltage is applied to the electric motor M to generate an opposed rotational output so as to drive the cover panel to turn through the gear unit and cam. As a result, the cover panel will move at the route of 10° to completely finish the total route thereof to its close state. It is worth to mention that all other necessary components of the container, which are not mentioned above, are the same as the conventional container.

What is claimed is:

1. A container, comprising a container body, a container cover having a cover panel, an electric motor, and a transmission device transmitting an output of said electric motor to said cover panel, wherein said container cover comprises a route sensor and controller which comprises a route feeler and a cut-off circuit, wherein said route feeler is electrically connected to a controlled end of said cut-off circuit, wherein said cut-off circuit is electrically connected to said electric motor, wherein when said cut-off circuit receives an actuating signal from said route feeler, said cut-off circuit deactivates said electric motor to generate said output thereof, wherein said cut-off circuit receives said actuating signal at a trigger point during said cover panel is in a closing process that a route of said cover panel is smaller than a total route of said cover panel between an open state and a close state, wherein said route sensor and controller further comprises a sampling circuit, a reference circuit and a comparing circuit, wherein said sampling circuit and said reference circuit are respectively connected to said comparing circuit, wherein an output end of said comparing circuit is connected to a controlling end of said cut-off circuit, wherein said sampling circuit comprises one of a position sensor and a combination of said position sensor and a computing circuit.

2. The container, as recited in claim 1, wherein said sampling circuit, said reference circuit, and said comparing circuit are integrated in a IC3 of type CF745.

* * * * *